Patented Dec. 2, 1952

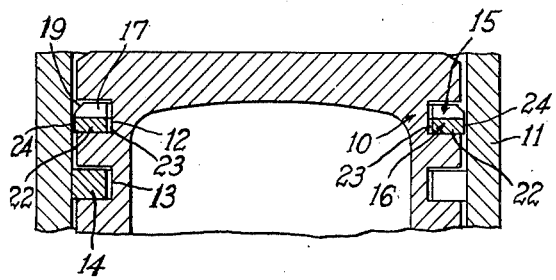
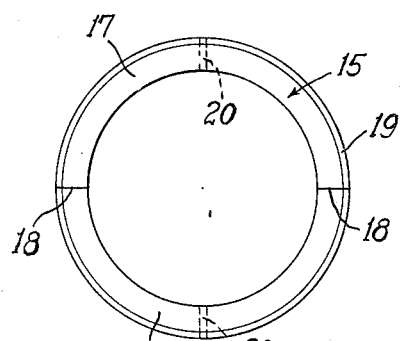
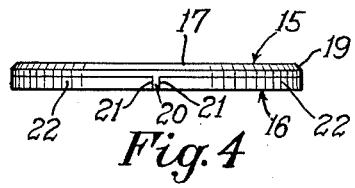
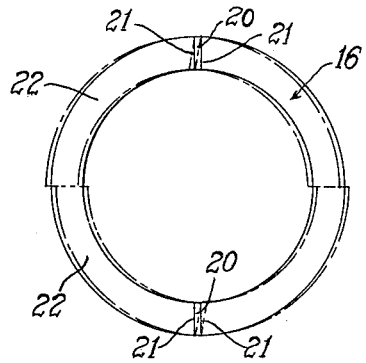
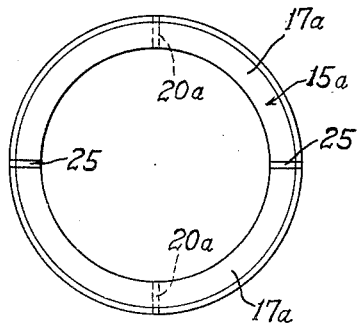
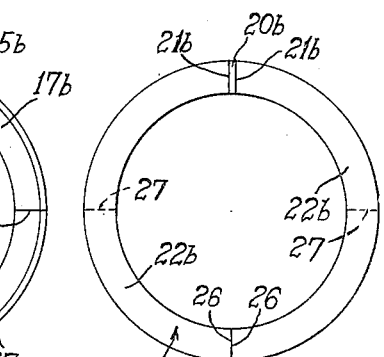

2,620,245

UNITED STATES PATENT OFFICE 2,620,245

MULTIPLE SECTION PISTON RING

Arleigh R. Moore, Canton, and Donald R. Minser, Hartville, Ohio

Application May 20, 1950, Serial No. 163,116

7 Claims. (Cl. 309—47)

The invention relates to piston rings for use in internal combustion engines, and the like, and more particularly to a ring especially adapted for use as a pressure or compression ring in the piston of an internal combustion engine.

The usual form of piston ring now in general use, comprises a split, spring ring which is engaged in place on the piston in a suitable groove therefor, the ring being in contact with the cylinder wall throughout its circumference and having a gap usually of about .020 of an inch between the ends of the ring.

There are certain disadvantages in such construction of piston rings, as they cause continual wear against the cylinder walls, frequently resulting in scoring or marring of the surface thereof. Furthermore, there is a leakage of pressure through the gap in the ring, which is undesirable.

It is therefore an object of the present invention to provide a piston ring which will overcome these disadvantages and objections.

Another object is to provide a piston ring so constructed that it will not engage the cylinder wall at any point around its circumference.

A further object is to provide a piston ring so constructed that an equal pressure will be maintained around the entire circumference thereof.

A still further object is to provide such a piston ring which will be floatingly mounted in the groove in the piston provided therefor, and which will not collapse under pressure and will not stick in the groove.

Another object is to provide a piston ring of this character in which the clearance is distributed around the entire circumference of the ring and is slightly less than the gap of the usual open-end ring, whereby there is a uniform slight pressure around the entire circumference of the ring instead of an extreme pressure as through the gap of the present type of ring.

Still another object is to provide a ring of the character referred to which will automatically seat upon the bottom of the groove in the piston.

A further object is to provide a piston ring comprising a top section and a bottom section, each formed of two half-circular members with radially disposed keys upon one or more of said half-circular members interposed between the opposed ends of the half-circular members of the other section of the ring, whereby the several members of the ring will automatically adjust themselves to the contour of the cylinder under varying conditions of pressure.

The above objects together with others which will be apparent from the drawing and following description, or which may be later referred to, may be attained by constructing the improved piston ring in the manner hereinafter described in detail and illustrated in the accompanying drawing, in which;

Figure 1 is a fragmentary, vertical, sectional view of the upper portion of an internal combustion engine piston and the adjacent portion of the cylinder wall, showing the improved piston ring mounted therein;

Fig. 2 a detached, top plan view of a piston ring embodying the invention;

Fig. 3 a bottom plan view of the ring, showing in broken lines the manner in which the ring automatically adjusts itself under pressure to conform to the cylinder walls;

Fig. 4 a detached side elevation of the improved ring;

Fig. 5 a top plan view of a modification of the piston ring, in which each half-circular member of each section of the ring is provided with a key interposed between the opposed ends of the half-circular members of the other section of the ring;

Fig. 6 a bottom plan view of the ring shown in Fig. 5;

Fig. 7 a top plan view of another modification of the ring in which a single key is provided; and, Fig. 8 a bottom plan view of the ring shown in Fig. 7.

Referring first to the form of the improved piston ring shown in Figs. 1 to 4, in which similar numerals refer to similar parts throughout, the upper portion of a conventional internal combustion engine piston is indicated generally at 10 and the adjacent portion of the cylinder wall is shown at 11. The piston 10 is provided with the usual ring grooves 12 and 13 in its upper portion.

While the improved piston ring to which the invention pertains may be used in both grooves 12 and 13, this ring is shown in Fig. 1 only in the upper groove 12, being used as the pressure or compression ring, while the conventional snap ring, indicated at 14, is shown in the groove 13.

The improved piston ring comprises an upper section, indicated generally at 15, and a lower section, indicated generally at 16, each section comprising two half-circular members. For this purpose the upper section of the ring comprises the two half-circular members 17, the opposed ends of which abut as at 18. For a purpose to be later described, the upper, outer corner of the upper section 15 of the ring is bevelled as at 19.

Each of the half-circular members 17 of the top section of the ring is provided with a depending key 20, at a point midway between its ends, these keys fitting between the opposed ends 21 of the half-circular members 22 which form the bottom section 16 of the ring.

As shown in Fig. 1, this composite ring is mounted to float within the groove 12 of the piston, there being a clearance, as indicated at 23, between the inside of the ring and the back wall of the groove 12, and a very slight clearance, as indicated at 24, between the circumference of the ring and the cylinder walls.

It should be understood, of course, that these clearances are greatly exaggerated in the drawing for the purpose of illustration. In actual practice the clearance 24, between the circumference of the ring and the cylinder walls, is only about .001 of an inch and the clearance at 23, between the inside of the ring and the back wall of the groove 12, is only a few thousandths of an inch.

With this construction the ring acts in the same manner as a completely closed ring, as it cannot collapse under pressure and does not stick in the groove, and there is no cylinder wall drag.

This two-section piston ring, with each section formed of two half-circular members, and a key upon one member interposed between the opposed ends of the members of the other section, has the ability to conform to the cylinder wall under varying conditions of pressure, due to the lever action of the keys in the top section operating the members of the bottom section, as indicated in broken lines in Fig. 3.

It should be understood that the movement of the several members of the ring, indicated in broken lines in this figure, is greatly exaggerated but is merely for the purpose of illustration.

It will be seen that any excess pressure at any point around either member 17 of the top section 15 of the ring, which may produce a slight twisting movement of that member will, through the key 20 thereon, produce a compensating movement of the half-circular members 22 of the bottom section, so that the entire circumference of the composite ring will follow the contour of the cylinder wall much better than the present type of piston ring.

The bevelled upper, outer corner 19 of the top section of the ring is provided in order that the explosion pressure in the cylinder will cause the ring to seat upon the bottom wall of the groove 12 in the piston. This bevel prevents the ring from being blown out hard against the cylinder wall during compression and explosion strokes.

It will be seen that instead of allowing all of the explosion pressure to pass downward at one point, as in the gap of the conventional snap ring now in general use, this pressure is distributed uniformly around the entire circumference of the improved piston ring.

In use, the cylinder wall will remain perfectly round at the top because the improved piston ring does not drag hard on the cylinder wall, as is common with the conventional type of piston ring, caused by behind-ring pressure and piston tilt.

With a correctly fitted piston the periphery of the ring at no time contacts the cylinder wall, consequently eliminating the out-of-roundness caused by the present type of ring.

Since this ring seats upon the bottom of the ring groove at all times, except at the suction stroke, it eliminates behind-ring pressure. If desired, a slightly wider ring may be used than is customary with the conventional type of ring, because there is no cylinder wall drag and no out-of-round wear on the face of the ring produced by piston drag, since the ring automatically centers itself in the cylinder at all times.

Depending upon the material from which the ring is formed the clearance entirely around the circumference of the improved ring may be about the same or slightly less than the gap in the conventional open-end ring.

Therefore the flow of pressure is divided entirely around the circumference of the ring, so that the same is always negligible compared to the extreme pressure which passes through the gap of the conventional ring. When this pressure hits the second ring at the explosion stroke this ring is not blown out hard against the cylinder wall due to the construction as above described. The improved ring will operate with the least possible clearance since it is not necessary to allow for expansion due to cylinder wall friction.

The improved ring has less chance of leakage than the conventional snap ring which follows the cylinder wall. Assuming that both rings have the same clearance at the start, it will be seen that the open-end or snap ring widens out at the gap when cylinder wall distortion takes place, thus increasing the leakage.

Furthermore, the open-end or snap ring will collapse inwardly under extreme pressure while the improved ring cannot collapse. A proof of the fact that the open-end ring does collapse inwardly is the unequal fuel consumption ratio at high speed.

In Figs. 5 and 6 is shown a modified form of the improved ring in which the upper section, indicated generally at 15a, is formed of two half-circular members 17a, each having a radially disposed key 20a at a point midway between its ends, which is interposed between the opposed ends of the half-circular members 22a of the bottom section 16a.

A radially disposed key 25 is fixed upon the upper side of each half-circular member 22a of the lower section and interposed between the opposed ends of the half-circular members 17a of the top section of the ring. Otherwise the construction and operation of this ring is the same as shown and described with reference to Figs. 1 to 4.

In Figs. 7 and 8 is shown another modification in which only one half-circular member 17b, of the top section 15b, is provided on its underside, midway of its ends, with a radially disposed key 20b interposed between the abutting ends 21b of the half-circular members 22b of the bottom section 16b.

The other half-circular member 17c, of the top section, has no key, so that the opposed ends 26 of the half-circular members 22b of the bottom section abut, as best shown in Fig. 8. In the same manner the opposed ends of the half-circular members 17c of the top section abut, as indicated at 27. Otherwise the construction and operation of this form of the ring is the same as above described.

We claim:

1. A piston ring of the character described comprising a top section and a bottom section, each section comprising two separate opposed half-circular members, and a transverse key upon an intermediate portion of one of the members of one section interposed between the opposed ends of the members of the other section, the opposed surfaces of the top and bottom sections being flat except for said transverse key, whereby turning movement of the member provided with the key will through lever action of the key cause a turning movement of the members of the other section.

2. A piston ring of the character described comprising a top section and a bottom section, each section comprising two separate opposed half-circular members, and a transverse key upon an intermediate portion of each member of the top section interposed between the opposed ends of the members of the bottom section, the opposed surfaces of the top and bottom sections being flat except for said transverse keys, whereby turning movement of the members of the top section will through lever action of the keys cause a turning movement of the members of the bottom section.

3. A piston ring of the character described comprising a top section and a bottom section, each section comprising two opposed half-circular members, a transverse key upon an intermediate portion of each member of the top section interposed between the opposed ends of the members of the bottom section, and a transverse key upon an intermediate portion of each member of the bottom section interposed between the opposed ends of the members of the top section.

4. A piston ring of the character described comprising a top section and a bottom section, each section comprising two opposed half-circular members, the outer, upper corner of each member of the top section being bevelled, and a transverse key upon an intermediate portion of one of the members of one section interposed between the opposed ends of the members of the other section.

5. A piston ring of the character described comprising a top section and a bottom section, each section comprising two opposed half-circular members, the outer, upper corner of each member of the top section being bevelled, and a transverse key upon an intermediate portion of each member of the top section interposed between the opposed ends of the members of the bottom section.

6. A piston ring of the character described comprising a top section and a bottom section, each section comprising two opposed half-circular members, the outer, upper corner of each member of the top section being bevelled, a transverse key upon an intermediate portion of each member of the top section interposed between the opposed ends of the members of the bottom section and a transverse key upon an intermediate portion of each member of the bottom section interposed between the opposed ends of the members of the top section.

7. A piston ring of the character described comprising a top section and a bottom section, each section comprising two opposed half-circular members, the opposed ends of the members in each section being staggered relative to the opposed ends of the members of the other section, and interengaging means between the sections for preventing relative rotation of said sections.

ARLEIGH R. MOORE.
DONALD R. MINSER.

REFERENCES CITED

The following references are of record in the file of this patent:

UNITED STATES PATENTS

| Number | Name | Date |
| --- | --- | --- |
| 1,413,409 | Lackman | Apr. 18, 1922 |
| 1,419,781 | Trippensee | June 13, 1922 |
| 1,720,128 | Kerns | July 9, 1929 |
| 2,055,153 | Madsen | Sept. 22, 1936 |

FOREIGN PATENTS

| Number | Country | Date |
| --- | --- | --- |
| 485,000 | France | of 1917 |
| 362,138 | Great Britain | of 1931 |
| 397,782 | Great Britain | of 1933 |